(12) United States Patent
Sugino et al.

(10) Patent No.: US 12,094,102 B2
(45) Date of Patent: Sep. 17, 2024

(54) INSPECTION DEVICE, INSPECTION METHOD, MACHINE LEARNING DEVICE, AND MACHINE LEARNING METHOD

(71) Applicant: SINTOKOGIO, LTD., Nagoya (JP)

(72) Inventors: Takehiro Sugino, Nagoya (JP); Takeshi Sonohara, Nagoya (JP)

(73) Assignee: SINTOKOGIO, LTD., Aichi (JP)

( * ) Notice: Subject to any disclaimer, the term of this patent is extended or adjusted under 35 U.S.C. 154(b) by 83 days.

(21) Appl. No.: 17/518,680

(22) Filed: Nov. 4, 2021

(65) Prior Publication Data

US 2022/0207684 A1 Jun. 30, 2022

(30) Foreign Application Priority Data

Dec. 25, 2020 (JP) ................. 2020-217535

(51) Int. Cl.
*G06T 7/00* (2017.01)
*G01N 21/95* (2006.01)
*G01N 21/88* (2006.01)
*G01N 21/956* (2006.01)

(52) U.S. Cl.
CPC ......... *G06T 7/001* (2013.01); *G01N 21/9501* (2013.01); *G01N 2021/8887* (2013.01); *G01N 2021/95615* (2013.01); *G06T 2207/20081* (2013.01); *G06T 2207/30148* (2013.01)

(58) Field of Classification Search
CPC .......... G06T 7/001; G06T 2207/20081; G06T 2207/30148; G06T 2207/20084; G06T 7/0004; G06T 7/60; G06T 7/62; G06T 2207/30116; G06T 2207/30136; G01N 21/9501; G01N 2021/8887; G01N 2021/95615; G01N 21/8851
See application file for complete search history.

(56) References Cited

U.S. PATENT DOCUMENTS

| | | | | |
|---|---|---|---|---|
| 6,005,959 A | * | 12/1999 | Mohan | G01G 19/4144 382/199 |
| 10,885,626 B2 | * | 1/2021 | Tamai | G06V 20/00 |
| 11,158,041 B2 | * | 10/2021 | Ota | G01N 21/9515 |
| 11,562,480 B2 | * | 1/2023 | Hyatt | G06T 7/0004 |
| 2018/0180534 A1 | * | 6/2018 | Noda | G06T 7/0004 |
| 2018/0370027 A1 | * | 12/2018 | Oota | G06F 18/217 |
| 2019/0188543 A1 | * | 6/2019 | Tamai | G06F 18/40 |
| 2019/0304851 A1 | * | 10/2019 | Smith | G01N 21/9501 |
| 2020/0018707 A1 | * | 1/2020 | Hanabusa | F21V 7/043 |

(Continued)

FOREIGN PATENT DOCUMENTS

JP H07-198627 A 8/1995
JP 2020-157333 A 10/2020
(Continued)

*Primary Examiner* — Roy M Punnoose
(74) *Attorney, Agent, or Firm* — Harness, Dickey & Pierce, P.L.C.

(57) ABSTRACT

The purpose of the present invention is to improve accuracy in inspection of an appearance of a mold. The inspection device includes at least one processor for performing an inspection step of inspecting an appearance of a mold using a learned model constructed by machine learning. Input into the learned model includes an inspection image obtained by imaging the appearance of the mold. Output from the learned model is information indicating an inspection result of the appearance of the mold.

9 Claims, 10 Drawing Sheets

(56) References Cited

U.S. PATENT DOCUMENTS

| | | | |
|---|---|---|---|
| 2020/0234419 A1* | 7/2020 | Ota | G01N 21/90 |
| 2020/0279359 A1* | 9/2020 | Kimura | G06T 1/60 |
| 2020/0292462 A1 | 9/2020 | Chen et al. | |
| 2020/0300778 A1* | 9/2020 | Hoshino | G06V 10/945 |
| 2021/0012475 A1* | 1/2021 | Hyatt | G01N 21/8851 |
| 2021/0303896 A1* | 9/2021 | Hoshino | G06V 10/30 |
| 2021/0364447 A1* | 11/2021 | Naruse | G06V 10/772 |
| 2022/0084182 A1 | 3/2022 | Ohya et al. | |
| 2022/0390385 A1* | 12/2022 | Aikawa | G06T 7/0002 |

FOREIGN PATENT DOCUMENTS

| | | |
|---|---|---|
| JP | 2020-198471 A | 12/2020 |
| WO | WO-2018/216495 A1 | 11/2018 |

* cited by examiner

INSPECTION DEVICE, INSPECTION METHOD, MACHINE LEARNING DEVICE, AND MACHINE LEARNING METHOD

This Nonprovisional application claims priority under 35 U.S.C. § 119 on Patent Application No. 2020-217535 filed in Japan on Dec. 25, 2020, the entire contents of which are hereby incorporated by reference.

TECHNICAL FIELD

The present invention relates to a technique to inspect an appearance of a mold.

BACKGROUND ART

Patent Literature 1 discloses an inspection device for inspecting an appearance of a mold. The inspection device generates a difference image between an inspection image obtained by imaging the mold and a reference image prepared in advance, and determines whether or not the mold is normal based on the generated difference image.

CITATION LIST

Patent Literature

[Patent Literature 1]
International Publication No. WO 2018/216495 (International Publication Date: Nov. 29, 2018)

SUMMARY OF INVENTION

Technical Problem

The above inspection device may determine that a mold which is actually normal is not normal, or may determine that a mold which is actually not normal is normal, and there is room for improving the inspection accuracy.

For example, the above inspection device determines whether or not a mold is normal after removing a pseudo defect from among defects obtained by analyzing the difference image. The pseudo defect is generated, for example, when light emitted in imaging is reflected by a parting agent attached to the mold. The above inspection device removes a pseudo defect by predefining features of such a pseudo defect. However, it is difficult to predefine all features of a pseudo defect. Therefore, the above inspection device cannot remove a pseudo defect indicating a feature which is not predefined. In addition, it is difficult to define features which are not indicated by actual defects as features of a pseudo defect. Therefore, the above inspection device removes an actual defect when the actual defect exhibits the predefined feature of the pseudo defect.

An object of an aspect of the present invention is to realize a technique for improving accuracy in inspection of an appearance of a mold.

Solution to Problem

The inspection device in accordance with an aspect of the present invention includes at least one processor for performing an inspection step of inspecting an appearance of a mold using a learned model constructed by machine learning. An inspection method in accordance with an aspect of the present invention includes an inspection step of inspecting an appearance of a mold using a learned model constructed by machine learning, the inspection step being performed by at least one processor.

A machine learning device in accordance with an aspect of the present invention includes at least one processor for performing a construction step of constructing, by supervised learning with a dataset-for-learning, a learned model for inspecting an appearance of a mold. A machine learning method in accordance with an aspect of the present invention includes a construction step of constructing, by supervised learning with a dataset-for-learning, a learned model for inspecting an appearance of a mold, the construction step being performed by at least one processor.

In the inspection device, the inspection method, the machine learning device, and the machine learning method, input into the learned model includes an inspection image obtained by imaging the appearance of the mold. Output from the learned model is information indicating an inspection result of the appearance of the mold.

Advantageous Effects of Invention

According to an aspect of the present invention, it is possible to realize a technique for improving accuracy in inspection of an appearance of a mold.

DESCRIPTION OF EMBODIMENTS

[Inspection System S]

Figure 1:
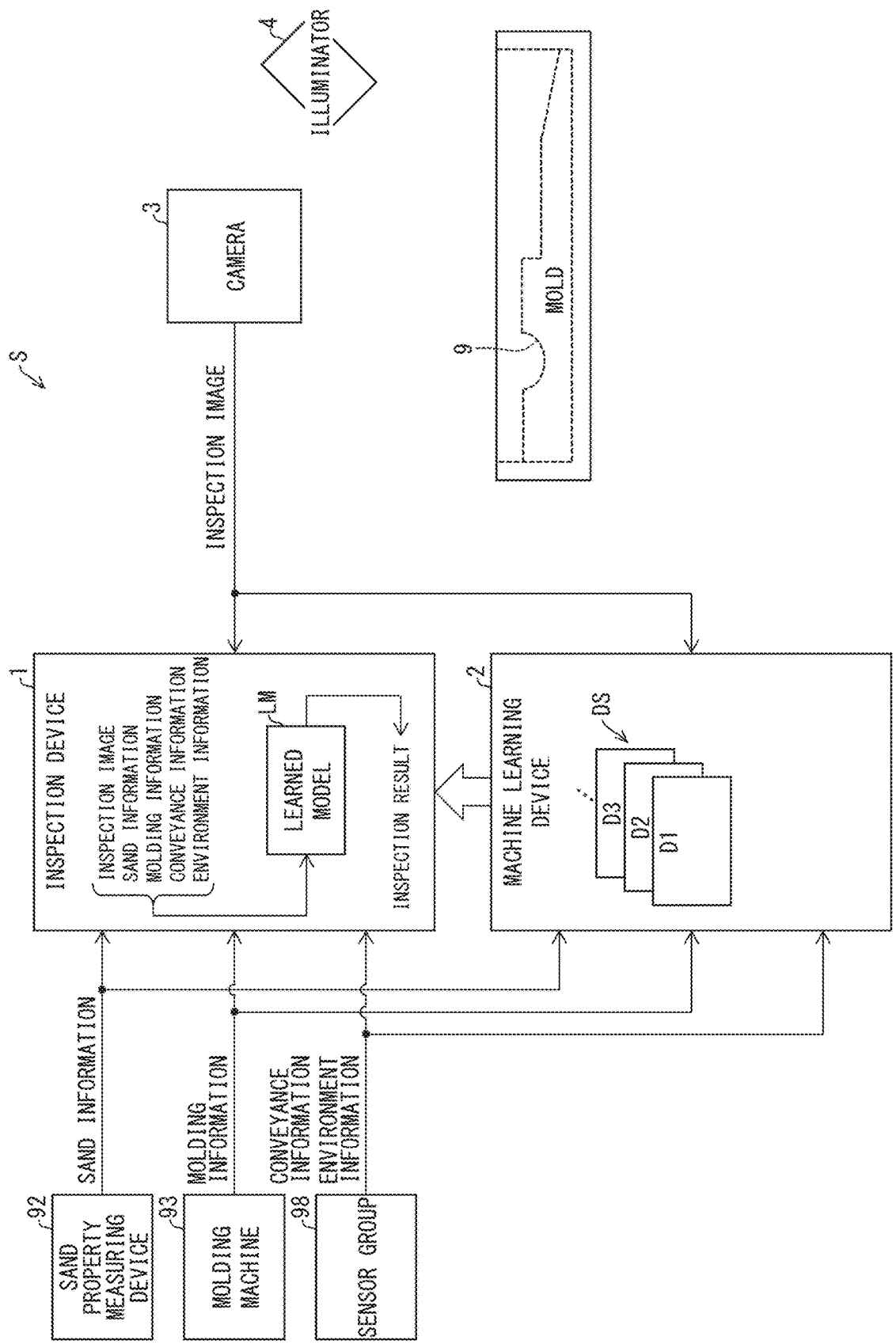
FIG. 1 is a diagram showing a configuration of an inspection system according to an embodiment of the present invention.

The following description will discuss an inspection system S according to an embodiment of the present invention with reference to FIG. 1. FIG. 1 is a diagram showing a configuration of the inspection system S.

The inspection system S is a system for inspecting an appearance of a mold 9. In this embodiment, the inspection system S inspects in particular an appearance of a product surface of the mold 9. If there is a defect such as a mold drop in the product surface of the mold 9, quality of a casting formed by using the mold 9 is deteriorated. By inspecting the product surface of the mold 9 by the inspection system S, it is possible to determine whether or not a process subsequent to the inspection should be performed, and it is consequently possible to inhibit generation of defective products. Here, the product surface of the mold 9 refers to a surface of the mold 9 whose shape is copied to products.

As shown in FIG. 1, the inspection system S includes an inspection device 1, a machine learning device 2, a camera 3, and an illuminator 4. The inspection device 1 is communicatively connected to each of a sand property measuring device 92, a molding machine 93, and a sensor group 98. The machine learning device 2 is communicatively connected to each of the sand property measuring device 92, the molding machine 93, and the sensor group 98.

The camera 3 images the product surface of the mold 9 to generate an inspection image. The product surface of the mold 9 is configured not to be exposed to the outside after a cope corresponding to an upper part of the mold 9 and a drag corresponding to a lower part of the mold 9 are assembled. Therefore, the camera 3 cannot image the product surface of the mold 9 after the cope and the drag are assembled. In view of this, the camera 3 is placed at a position at which the product surface of the mold 9 can be imaged before the cope and the drag are assembled. Moreover, when a core is placed in the mold 9, the camera 3 cannot image a part of the product surface of the mold 9 hidden behind the core after the core is placed. In this case, the camera 3 is placed at a position at which the product surface of the mold 9 can be imaged before the core is placed. For example, the camera 3 is placed at a position at which the product surface of the mold 9 can be imaged in the vicinity of a conveyance path from the molding machine 93 to a core setting area 95 (described later).

The illuminator 4 emits light to the product surface of the mold 9 in imaging by the camera 3. As the configurations of the camera 3 and the illuminator 4, it is possible to employ the configurations disclosed in Patent Literature 1 above.

The inspection device 1 is a device for performing an inspection method M1. The inspection method M1 involves inspecting the product surface of the mold 9 based on at least an inspection image obtained from the camera 3 with use of a learned model LM constructed by machine learning. Examples of the learned model LM include algorithms such as neural network models (e.g., convolutional neural network and recurrent neural network), and support vector machines. A configuration of the inspection device 1 and a flow of the inspection method M1 will be described later in detail with reference to different drawings.

The machine learning device 2 is configured to perform a machine learning method M2. The machine learning method M2 involves: constructing a dataset-for-learning DS with use of at least an inspection image obtained from the camera 3; and constructing a learned model LM by machine learning (supervised learning) using the dataset-for-learning DS.

A configuration of the machine learning device 2 and a flow of the machine learning method M2 will be described later in detail with reference to different drawings.

[Input into Learned Model LM]

Input into the learned model LM includes an inspection image. The input into the learned model LM further includes one or more or all of sand information, molding information, conveyance information, and environment information. Those input data will be described below.

The inspection image is an image generated by imaging, with the camera 3, the product surface of the mold 9. The inspection image includes the product surface of the mold 9 as a subject.

The sand information indicates foundry sand constituting the mold 9. The sand information includes one of or all of pieces of information indicating a type and a property of the foundry sand constituting the mold 9. Examples of the information indicating the property of foundry sand include a water content in the foundry sand, a compactability value, a sand temperature, air permeability, compression strength, and the like. The sand information is outputted from the sand property measuring device 92.

The molding information indicates a molding status of the mold 9. Examples of the molding status include a status of the mold 9 and a status of the molding machine 93 at the time of molding. Examples of the information indicating the status of the mold 9 include parting agent information. The parting agent information relates to a parting agent applied to the mold 9. The parting agent information includes, for example, pieces of information relating to a type of the parting agent, an amount of coating, and the number of times of coating. The information indicating the status of the molding machine 93 includes device setting information. The setting information includes, for example, pieces of information indicating squeeze pressure, a sand introduction time, pressure in sand introduction, a weight of introduced sand, and a use status of the molding machine. Examples of the use status of the molding machine include the number of molding operations, wear statuses of components, and the like. Examples of components that may wear include a seal component of a carrier plate, and the like. The molding information is outputted from the molding machine 93. Note that the parting agent can be applied to the mold 9 by one or both of an operator and the molding machine 93. In this case, the parting agent information can be inputted by the operator.

The conveyance information indicates a conveyance status of the mold 9. In a casting line C described later, the mold 9 is conveyed from the molding machine 93 toward a downstream side. The downstream side is a side at which a pouring machine 97 (described later) resides when seen from the molding machine 93. The conveyance information includes, for example, information indicating external force applied to the mold 9 during conveyance thereof. The conveyance information is outputted from any sensor of the sensor group 98.

External force applied to the mold 9 can be applied to the mold 9 at a time other than during conveyance. In this case, input into the learned model LM can include information indicating external force applied to the mold 9 at a time other than during conveyance. Examples of such processes other than during conveyance include sand cutting, gas vent formation, sprue formation, flask inversion, molding board bogie setting, and the like. In this case, the sensor group 98 includes a sensor for measuring the external force in one or more or all of those processes.

The environment information indicates surroundings of the molding machine 93 or the inspection device 1. Note that, in a case where the environment information indicates the surroundings of the inspection device 1, the inspection device 1 is placed around the casting line C (described later). The environment information includes, for example, information indicating one or more or all of an air temperature, humidity, and a concentration of floating dust. The environment information is outputted from any sensor of the sensor group 98.

[Output from Learned Model LM]

Output from the learned model LM is information indicating an inspection result of the product surface of the mold 9. The information indicating the inspection result includes one or both of information indicating presence or absence of a defect and information indicating one or more defect regions. In the present embodiment, the information indicating the inspection result is described as including both of those pieces of information. Those pieces of information will be described below.

The information indicating presence or absence of a defect indicates, for example, presence or absence of a mold drop. The information indicating presence or absence of a defect is, for example, binary information indicating presence or absence.

The information indicating defect regions indicates, for example, a location where a mold drop has occurred in the product surface of the mold 9. In a case where a defect occurs at one location in the product surface of the mold 9, the learned model LM outputs information indicating a region of the one defect. In a case where defects have occurred in a plurality of locations, the learned model LM outputs information indicating respective regions of the plurality of defects. The information indicating a region of each defect includes pieces of information indicating a location, a size, and a shape of that defect.

The information indicating the location of a defect is represented, for example, by a location of an image of the defect in the inspection image. As a specific example, the information indicating the location of a defect can be coordinates of any of vertices of a rectangle that encompasses an image of the defect (e.g., circumscribes the image of the defect) in the inspection image.

The information indicating the size of a defect is represented, for example, by a size of an image of the defect in the inspection image. As a specific example, the information indicating the size of a defect can be an area of the foregoing rectangle.

The information indicating the shape of a defect is represented, for example, by a shape of an image of the defect in the inspection image. As a specific example, the information indicating the shape of a defect can be an aspect ratio of the foregoing rectangle.

Note that the information indicating the region of a defect can be any information that allows a user to recognize the location, size, and shape of a defect, and is not necessarily represented as numerical values. For example, the information indicating the region of a defect can be represented by superimposing a rectangle, which encompasses an image of a defect, on the inspection image.

[Phases from Introduction to Actual Use of Inspection System S]

The inspection system S proceeds through a preparatory phase and a trial phase and enters an actual use phase. The following description will roughly discuss the preparatory phase, the trial phase, and the actual use phase.

(1) Preparatory Phase

In the preparatory phase, the operator inspects the product surface of the mold 9, and the machine learning device 2 generates a dataset-for-learning DS to construct a learned model LM.

Specifically, the camera 3 generates an inspection image obtained by imaging the product surface of the mold 9, and inputs the inspection image into the machine learning device 2. The sand property measuring device 92 inputs sand information pertaining to the mold 9 into the machine learning device 2. The molding machine 93 inputs molding information pertaining to the mold 9 into the machine learning device 2. The sensor group 98 inputs conveyance information and environment information into the machine learning device 2. The operator inspects the product surface of the mold 9, and inputs information indicating the inspection result by the operator into the machine learning device 2 so that the information is associated with the inspection image. The information indicating the inspection result by the operator includes information indicating presence or absence of a defect. For example, in a case where the operator has determined that there are one or more defects in the product surface of the mold 9, the operator inputs information indicating the presence of defect into the machine learning device 2. The information indicating the inspection result by the operator includes information indicating one or more defect regions, in addition to the information indicating presence or absence of a defect. An example method of inputting information indicating one or more defect regions will be described below. For example, the operator inputs pieces of information indicating a location, a size, and a shape of each defect into the machine learning device 2. Specific examples of the operation of inputting those pieces of information include an operation of drawing a rectangle on the inspection image. In this case, the operator draws rectangles encompassing images of respective defects on an inspection image displayed on a display (not illustrated) or the like with an input device. The machine learning device 2 obtains pieces of information indicating a location, a size, and a shape of the defect from the rectangle drawn by the operator. In this manner, the machine learning device 2 obtains the information indicating presence or absence of a defect inputted by the operator and the information indicating the location, size, and shape of each defect inputted by the operator as the information indicating the inspection result by the operator. Each time the operator performs the inspection, the machine learning device 2 generates training data Di for which (i) an inspection image obtained from the camera 3 and (ii) sand information, molding information, conveyance information, and environment information inputted from the devices are used as input data, and (iii) information indicating the inspection result by the operator is used as correct data. The machine learning device 2 adds the generated training data Di to the dataset-for-learning DS. In the preparatory phase, it is assumed that the sand information, the molding information, the conveyance information, and the environment information are inputted from the devices to the machine learning device 2. However, one or more or all of those pieces of information can be inputted into the machine learning device 2 by the user. In this case, the operator who performs inspection and the user who inputs the data can be the same or different. The preparatory phase can end upon passage of a certain period (e.g., one week, one month, one year, etc.) from the start of the preparatory phase or may end when the number of times the inspection has been performed by the operator in the preparatory phase has reached a certain number (e.g., 100, 1000, 10000, etc.)

During the preparatory phase, the operator inspects product surfaces of molds 9 formed using a plurality of types of different patterns. In other words, the dataset-for-learning DS includes training data Di corresponding to each of a plurality of types of patterns.

Upon completion of the preparatory phase, the machine learning device 2 constructs the learned model LM by machine learning using the dataset-for-learning DS. The dataset-for-learning DS includes training data Di corresponding to each of a plurality of types of patterns, and consequently the constructed learned model LM functions commonly for the plurality of types of patterns. The constructed learned model LM is transferred from the machine learning device 2 to the inspection device 1.

(2) Trial Phase

In the trial phase, the operator inspects the product surface of the mold 9 and the inspection device 1 also inspects the product surface of the mold 9.

Specifically, the camera 3 generates an inspection image obtained by imaging the product surface of the mold 9, and inputs the inspection image into the inspection device 1. The sand property measuring device 92 inputs sand information pertaining to the mold 9 into the inspection device 1. The molding machine 93 inputs molding information pertaining to the mold 9 into the inspection device 1. The sensor group 98 inputs conveyance information and environment information into the inspection device 1. The inspection device 1 inputs the inspection image obtained from the camera 3 and the sand information, molding information, conveyance information, and environment information obtained from the devices into the learned model LM. The inspection device 1 outputs information indicating the inspection result obtained from the learned model LM.

The operator inspects the product surface of the mold 9. The operator compares the inspection result by the operator with the inspection result indicated by the output of the inspection device 1, and evaluates inspection accuracy of the inspection device 1. For example, in a case where 200 pieces of molds 9 are inspected in the trial phase and inspection results by the inspection device 1 have accorded with inspection results by the operator for 192 pieces of molds 9, the inspection accuracy is evaluated as 96%. In the trial phase, it is assumed that the sand information, the molding information, the conveyance information, and the environment information are inputted from the devices into the inspection device 1. However, one or more or all of those pieces of information can be inputted into the inspection device 1 by the user. In this case, the operator who performs inspection and the user who inputs the data can be the same or different. The trial phase can end upon passage of a certain period (e.g., one week, one month, one year, etc.) from the start of the trial phase or can end when the number of times the inspection of the mold 9 has been performed in the trial phase has reached a certain number (e.g., 100, 1000, 10000, etc.) If the inspection accuracy evaluated in the trial phase is unsatisfactory, the preparatory phase and the trial phase described above are performed again. In this case, additional training can be performed on the learned model LM in the preparatory phase that is performed again. If the inspection accuracy evaluated in the trial phase is satisfactory, the actual use phase described below is performed.

Here, there are cases where the inspection accuracy is evaluated and the phase is switched (i) by the inspection device 1, or (ii) by the operator. In the case of (i), the inspection device 1 evaluates the inspection accuracy of the inspection device 1 by comparing the inspection result that was inputted by the operator into the inspection device 1 with the inspection result by the inspection device 1. For example, if the inspection accuracy is equal to or lower than a predetermined threshold, the inspection device 1 determines that the preparatory phase needs to be performed again. The inspection device 1 then performs phase switching according to the result of the determination. Meanwhile, in the case of (ii), the operator evaluates the inspection accuracy of the inspection device 1 by comparing the inspection result that was outputted by the inspection device 1 with the inspection result by the operator. For example, if the inspection accuracy is equal to or lower than a predetermined threshold, the operator determines that the preparatory phase needs to be performed again. The inspection device 1 performs phase switching according to the result of the determination.

(3) Actual Use Phase

In the actual use phase, the inspection device 1 inspects the product surface of the mold 9.

Specifically, the camera 3 generates an inspection image obtained by imaging the product surface of the mold 9, and inputs the inspection image into the inspection device 1. The sand property measuring device 92 inputs sand information pertaining to the mold 9 into the inspection device 1. The molding machine 93 inputs molding information pertaining to the mold 9 into the inspection device 1. The sensor group 98 inputs conveyance information and environment information into the inspection device 1. The inspection device 1 inputs the inspection image obtained from the camera 3 and the sand information, molding information, conveyance information, and environment information obtained from the devices into the learned model LM. The inspection device 1 outputs information indicating the inspection result obtained from the learned model LM. The learned model LM used by the inspection device 1 in the actual use phase has been confirmed in the trial phase to have enough inspection accuracy. In the actual use phase, the inspection by the operator can be omitted. This eliminates the need for the operator to take time in inspection, and also makes it possible to run the casting line C efficiently.

Note that the present embodiment employs a configuration in which the input into the learned model LM is an inspection image and one or more or all of sand information, molding information, conveyance information, and environment information. However, the present invention is not limited to this. Out of those types of data, data which has a dominant influence on inspection result of the product surface of the mold 9 is the inspection image. The other types of data, i.e., the sand information, molding information, conveyance information, and environment information are used to improve the accuracy in inspection of the product surface of the mold 9, and the learned model LM does not need to receive all of them as input. That is, any configuration can be employed, provided that at least the inspection image is inputted into the learned model LM.

In the present embodiment, one or both of the information indicating presence or absence of a defect and information indicating one or more defect regions are outputted from the learned model LM. However, the present invention is not limited to this. For example, the output from the learned model LM can include information indicating a degree of a defect. The degree of a defect is, for example, a degree to which the defect affects quality of a product. Such an influential degree can vary, for example, depending on a location of a defect. Note that the degree of a defect is not limited to the above-described example.

[Configuration of Inspection Device]

Figure 2:
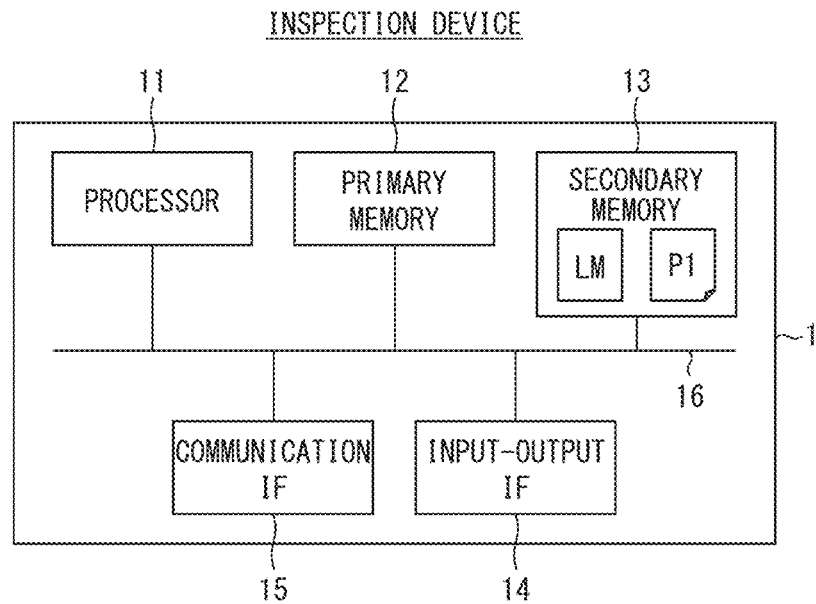
FIG. 2 is a block diagram showing a configuration of an inspection device included in an embodiment of the present invention.

A configuration of the inspection device 1 is discussed with reference to FIG. 2. FIG. 2 is a block diagram showing the configuration of the inspection device 1.

The inspection device 1 is realized by a general purpose computer, and includes a processor 11, a primary memory 12, a secondary memory 13, an input-output interface 14, a communication interface 15, and a bus 16. The processor 11, the primary memory 12, the secondary memory 13, the input-output interface 14, and the communication interface 15 are connected to one another through the bus 16.

The secondary memory 13 stores an inspection program P1 and the learned model LM. The processor 11 performs steps included in the inspection method M1 in accordance with instructions contained in the inspection program P1. The learned model LM is used when the processor 11 performs an inspection step M12 (described later) of the inspection method M1. The phrase "the secondary memory stores the learned model LM" means that parameters defining the learned model LM are stored in the secondary memory 13.

Examples of a device that can be used as the processor include, but not limited to, a central processing unit (CPU), a graphic processing unit (GPU), or a combination thereof. Examples of a device that can be used as the primary memory 12 include, but not limited to, a semiconductor random access memory (RAM). Examples of a device that can be used as the secondary memory 13 include, but not limited to, a flash memory, a hard disk drive (HDD), a solid state drive (SSD), or a combination thereof.

To the input-output interface 14, input device(s) and/or output device(s) are connected. Examples of the input-output interface 14 include, but not limited to, interfaces such as universal serial bus (USB).

To the communication interface 15, another computer is connected in a wired manner or wirelessly over a network. Examples of the communication interface 15 include, but not limited to, Ethernet (registered trademark) and Wi-Fi (registered trademark) interfaces, etc. Data (e.g., learned model LM) that the inspection device 1 obtains from another computer (e.g., machine learning device 2) in the inspection method M1, and data that the inspection device 1 provides to another computer in the inspection method M1, are transmitted and received over such a network(s).

For example, the camera 3, the sand property measuring device 92, the molding machine 93, and the sensor group 98 are connected to the communication interface 15. Data obtained from those devices in the inspection method M1 is inputted into the inspection device 1 via the communication interface 15 and stored in the primary memory 12. One or more or all of those devices are not necessarily connected to the communication interface 15, and can be connected to the input-output interface 14.

Note that, although the present embodiment employs a configuration in which a single processor (processor 11) is used to perform the inspection method M1, the present invention is not limited to this. That is, a configuration in which a plurality of processors are used to perform the inspection method M1 can be employed.

Although the present embodiment employs a configuration in which the learned model LM is stored in the memory (secondary memory 13) that is contained in the computer in which the processor (processor 11) that performs the inspection method M1 is contained, the present invention is not limited to this. That is, a configuration can be employed in which the learned model LM is stored in a memory that is contained in a computer different from the computer in which the processor that performs the inspection method M1 is contained.

Although the present embodiment employs a configuration in which the learned model LM is stored in a single memory (secondary memory 13), the present invention is not limited to this. That is, a configuration can be employed in which the learned model LM is divided and stored in a plurality of memories.

[Flow of Inspection Method]

Figure 3:
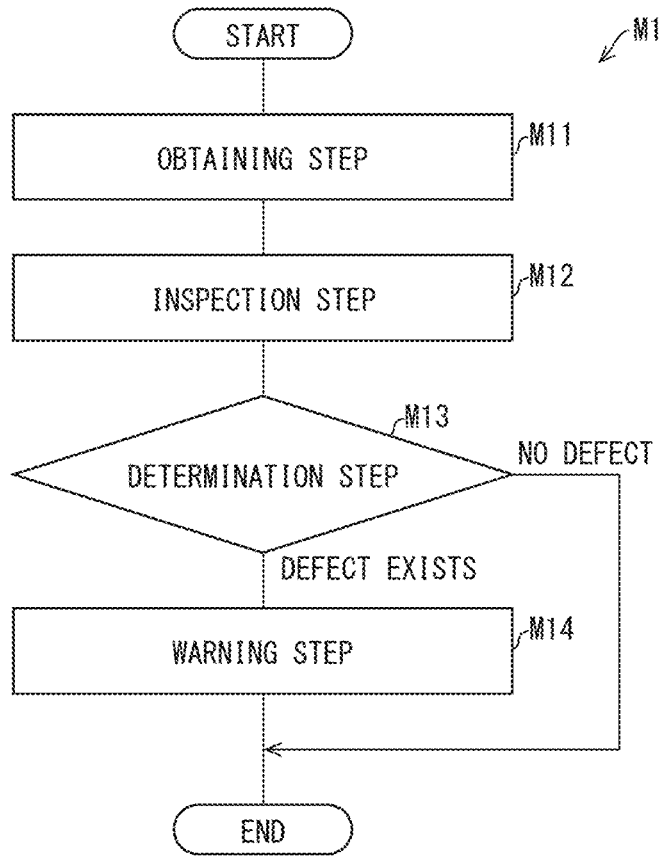
FIG. 3 is a flowchart showing a flow of an inspection method performed by an inspection device included in an embodiment of the present invention.

The following description will discuss a flow of the inspection method M1 with reference to FIG. 3. FIG. 3 is a flowchart showing the inspection method M1.

The inspection method M1 includes an obtaining step M11, an inspection step M12, a determination step M13, and a warning step M14.

The obtaining step M11 is a step in which the processor 11 obtains data to be inputted into the learned model LM. In the obtaining step M11, the processor 11 obtains an inspection image from the camera 3 and causes the primary memory 12 to store the inspection image. In the obtaining step M11, sand information, molding information, conveyance information, and environment information are obtained from the sand property measuring device 92, the molding machine 93, and the sensor group 98, and are stored in the primary memory 12.

The inspection step M12 is a step in which the processor 11 inspects the product surface of the mold 9 using the learned model LM. In the inspection step M12, the processor 11 reads the inspection image, the sand information, the molding information, the conveyance information, and the environment information from the primary memory 12 and inputs them into the learned model LM. Then, information indicating the inspection result outputted from the learned model LM is written in the primary memory 12. The information indicating the inspection result includes information indicating presence or absence of a defect and information indicating one or more defect regions.

The determination step M13 is a step in which the processor 11 determines whether or not there is a defect in the mold 9 on the basis of output from the learned model LM. If it has been determined in this step that a defect is present, the warning step M14 is performed. If it has been determined that there is no defect, the inspection method M1 ends.

The warning step M14 is a step in which the processor 11 outputs warning information based on output from the learned model LM. In the warning step M14, the processor generates warning information based on information indicating the inspection result outputted from the learned model LM.

The warning information is, for example, an image obtained by superimposing a graphic indicating a boundary line of a defect region on the inspection image. The warning information includes, for example, an occurrence frequency (number of occurrences, occurrence ratio, etc.) of defects in a plurality of molds formed using the same type of pattern as that of the mold 9.

The warning information includes, for example, an occurrence frequency (number of occurrences, occurrence ratio, etc.) of a defect at each portion in a plurality of molds formed using the same type of pattern as that of the mold 9. Portions at which defects have occurred are managed, for example, in blocks obtained by dividing the inspection image.

The processor 11 outputs the generated warning information using an output device. For example, in a case where the output device includes a display, the processor 11 generates an image representing the warning information and causes the display to display the image.

In a case where the warning information is outputted, the operator can skip a subsequent step(s) in the casting line C for the corresponding mold 9.

[Configuration of Machine Learning Device]

Figure 4:
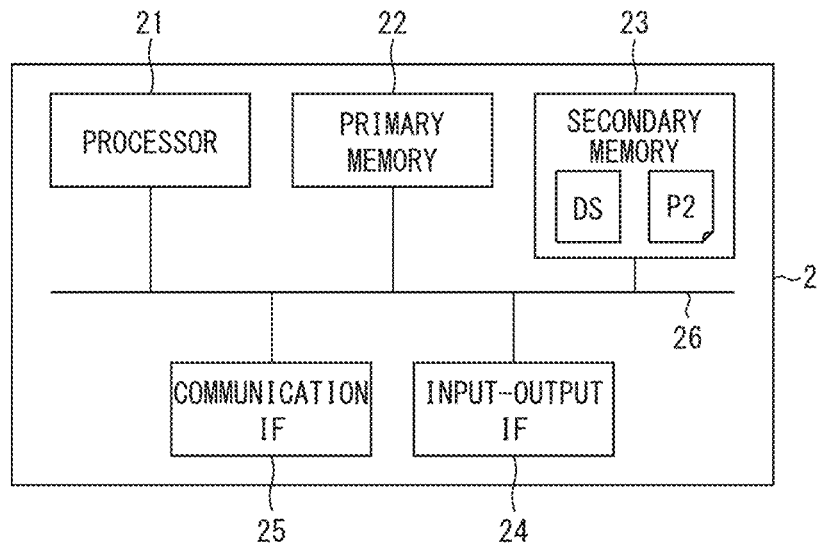
FIG. 4 is a block diagram showing a configuration of a machine learning device included in an embodiment of the present invention.

The following description will discuss a configuration of the machine learning device 2 with reference to FIG. 4. FIG. 4 is a block diagram showing the configuration of the machine learning device 2.

The machine learning device 2 is realized by a general purpose computer, and includes a processor 21, a primary memory 22, a secondary memory 23, an input-output interface 24, a communication interface 25, and a bus 26. The processor 21, the primary memory 22, the secondary memory 23, the input-output interface 24, and the communication interface 25 are connected to one another through the bus 26.

The secondary memory 23 stores a machine learning program P2 and a dataset-for-learning DS. The dataset-for-learning DS is a set of training data D1, D2, and so forth. The processor 21 performs steps included in the machine learning method M2 in accordance with instructions contained in the machine learning program P2. The dataset-for-learning DS is constructed in a step M21 of constructing dataset for learning (described later) of the machine learning method M2, and used in a step M22 of constructing learned model (described later) of the machine learning method M2. The learned model LM constructed in the step M22 of the machine learning method M2 is also stored in the secondary memory 23. The phrase "the learned model LM is stored in the secondary memory 23" means that parameters defining the learned model LM are stored in the secondary memory 23.

Examples of a device that can be used as the processor 21 include, but not limited to, a central processing unit (CPU), a graphic processing unit (GPU), or a combination thereof.

Examples of a device that can be used as the primary memory 22 include, but not limited to, a semiconductor random access memory (RAM). Examples of a device that can be used as the secondary memory 23 include, but not limited to, a flash memory, a hard disk drive (HDD), a solid state drive (SSD), or a combination thereof.

To the input-output interface 24, input device(s) and/or output device(s) are connected. Examples of the input-output interface 24 include, but not limited to, interfaces such as universal serial bus (USB).

To the communication interface 25, another computer is connected in a wired manner or wirelessly over a network. Examples of the communication interface 25 include, but not limited to, Ethernet (registered trademark) and Wi-Fi (registered trademark) interfaces, etc. Data (e.g., learned model LM) that the machine learning device 2 presents to another computer (e.g., inspection device 1) is transmitted and received over such a network(s).

For example, the camera 3, the sand property measuring device 92, the molding machine 93, and the sensor group 98 are connected to the communication interface 25. Data obtained from those devices in the machine learning method M2 is inputted into the machine learning device 2 via the communication interface 25 and stored in the primary memory 22. One or more or all of those devices are not necessarily connected to the communication interface 25, and can be connected to the input-output interface 24.

Note that, although the present embodiment employs a configuration in which a single processor (processor 21) is used to perform the machine learning method M2, the present invention is not limited to this. That is, a configuration in which a plurality of processors are used to perform the machine learning method M2 can be employed.

Although the present embodiment employs a configuration in which the dataset-for-learning DS is stored in the memory (secondary memory 23) that is contained in the computer in which the processor (processor 21) that performs the machine learning method M2 is contained, the present invention is not limited to this. That is, a configuration can be employed in which the dataset-for-learning DS is stored in a memory that is contained in a computer different from the computer in which the processor that performs the machine learning method M2 is contained.

Although the present embodiment employs a configuration in which the dataset-for-learning DS is stored in a single memory (secondary memory 23), the present invention is not limited to this. That is, a configuration can be employed in which the dataset-for-learning DS is divided and stored in a plurality of memories.

Although the present embodiment employs a configuration in which different processors (processor 11 and processor 21) are used to perform the inspection method M1 and the machine learning method M2, the present invention is not limited to this. That is, a single processor can be used to perform the inspection method M1 and the machine learning method M2.

[Flow of Machine Learning Method]

Figure 5:
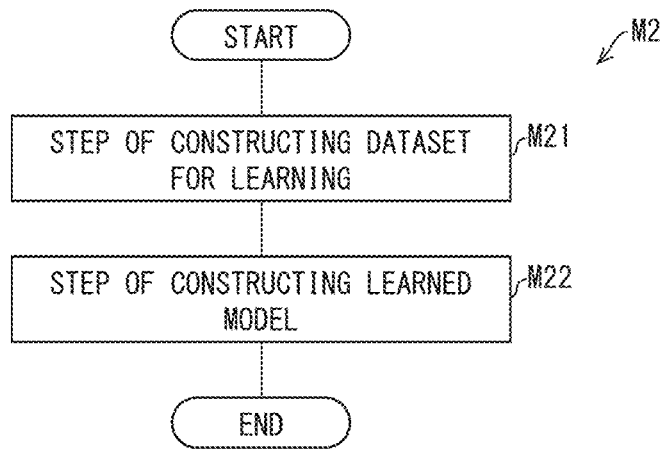
FIG. 5 is a flowchart showing a flow of a machine learning method performed by a machine learning device included in an embodiment of the present invention.

The following description will discuss a flow of the machine learning method M2 with reference to FIG. 5. FIG. 5 is a flowchart showing a flow of the machine learning method M2.

The machine learning method M2 includes the step M21 of constructing dataset for learning and the step M22 of constructing learned model.

The step M21 is a step in which the processor 21 constructs a dataset-for-learning DS which is a set of training data D1, D2, and so forth.

Each training data Di (i=1, 2, . . . ) includes input data including an inspection image, sand information, molding information, conveyance information, and environment information, and correct data including information indicating presence or absence of a defect and information indicating one or more defect regions. Specifically, in the step M21, the processor 21 obtains an inspection image from the camera 3. The processor 21 further obtains sand information, molding information, conveyance information, and environment information from the sand property measuring device 92, the molding machine 93, and the sensor group 98. Those pieces of information are related to the mold 9 which is included in the inspection image as a subject. The processor 21 also obtains information indicating presence or absence of a defect and information indicating one or more defect regions which are inputted by the user as information indicating the inspection result by the operator with respect to the inspected mold 9. The processor 21 causes the secondary memory 23 to store the training data Di including input data (inspection image, sand information, molding information, conveyance information, and environment information) obtained from the devices and correct data (information indicating the inspection result by the operator) inputted by the user. The processor 21 repeats the above-described processes to construct the dataset-for-learning DS.

The step M22 is a step in which the processor 21 constructs the learned model LM. In the step M22, the processor 21 constructs the learned model LM by supervised learning using the dataset-for-learning DS. The processor 21 then causes the secondary memory 23 to store the constructed learned model LM.

[Configuration of Casting Line C]

Figure 6:
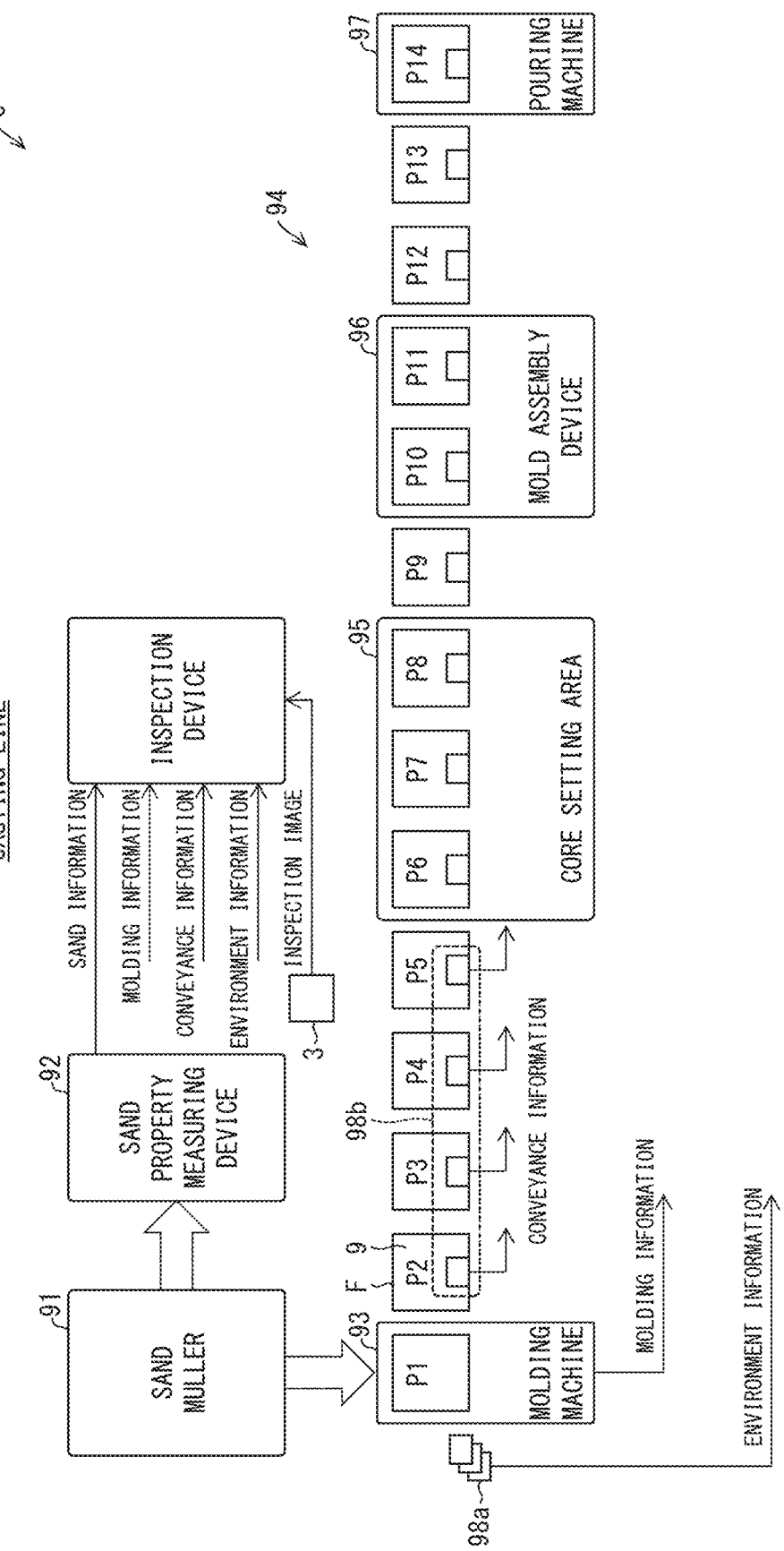
FIG. 6 is a block diagram showing a schematic configuration of a casting line to which an inspection system according to an embodiment of the present invention is applied.

A configuration of a part of the casting line C to which the inspection system S is applied will be described with reference to FIG. 6. FIG. 6 is a block diagram showing a schematic configuration of a part of the casting line C. The casting line C is a partial example of a system for producing castings by conveying a plurality of molds 9 along a conveyance path and pouring molten metal into the molds 9. The mold 9 used in the casting line C is a greensand mold, and a molding method is flask molding. However, the molding method in the casting line C can be a flaskless molding. Further, the casting line to which the inspection system S is applied can be a line using a self-hardening mold.

As shown in FIG. 6, the casting line C includes a sand muller 91, a sand property measuring device 92, a molding machine 93, a conveying device 94, a core setting area 95, a mold assembly device 96, a pouring machine 97, a sensor 98*a*, and a sensor 98*b*. The sensor 98*a* and the sensor 98*b* are examples of sensors included in the sensor group 98 shown in FIG. 1.

The sand muller 91 is a device for mixing foundry sand.

The sand property measuring device 92 is a device for measuring properties of the foundry sand mixed by the sand muller 91.

The molding machine 93 is a device for producing a mold 9 using a pattern. The molding machine 93 produces a cope and a drag of the mold 9.

The conveying device 94 is a device for conveying the mold 9 along the conveyance path from the molding machine 93 to the downstream side (pouring machine 97 side). The conveyance path, for example, is constituted by a roller conveyor (not illustrated) or a rail (not illustrated) which is laid from the molding machine 93 to the pouring machine 97. On the conveyance path, a plurality of molding flasks F are arranged at equal intervals from a position P1 to a position P14. The conveying device 94 conveys those molding flasks F one by one to the downstream side. When one molding flask F is conveyed to the downstream side, the molding flasks F arranged at the positions P1 through P13 are moved to the positions P2 through P14, respectively. The molding flask F arranged at the position P14 is moved to a position (not illustrated) downstream by one flask from the position P14. At the position P1, a new molding flask F is placed. In the vicinity of the conveyance path from the molding machine 93 to the core setting area 95 (here, the vicinity of the position P5), the camera 3 is provided.

An operator is stationed in the core setting area 95. The core setting area 95 is an area where the operator sets a core in the mold 9 prior to mold assembling.

The mold assembly device 96 is a device for assembling a cope and a drag.

The pouring machine 97 is a device for pouring molten metal into the mold 9.

The sensor 98*a* is a sensor group that senses surroundings of the molding machine 93 or the inspection device 1. The sensor 98*a* includes, for example, a temperature sensor, a humidity sensor, and a measuring device for measuring a concentration of floating dust. The sensors constituting the sensor 98*a* are provided around the molding machine 93 or the inspection device 1.

The sensor 98*b* is a sensor group for detecting external force applied to the mold 9. The sensor 98*b* is, for example, constituted by a plurality of acceleration sensors associated with the respective molding flasks F.

[Casting Process C100 Performed by Casting Line C]

Figure 7:
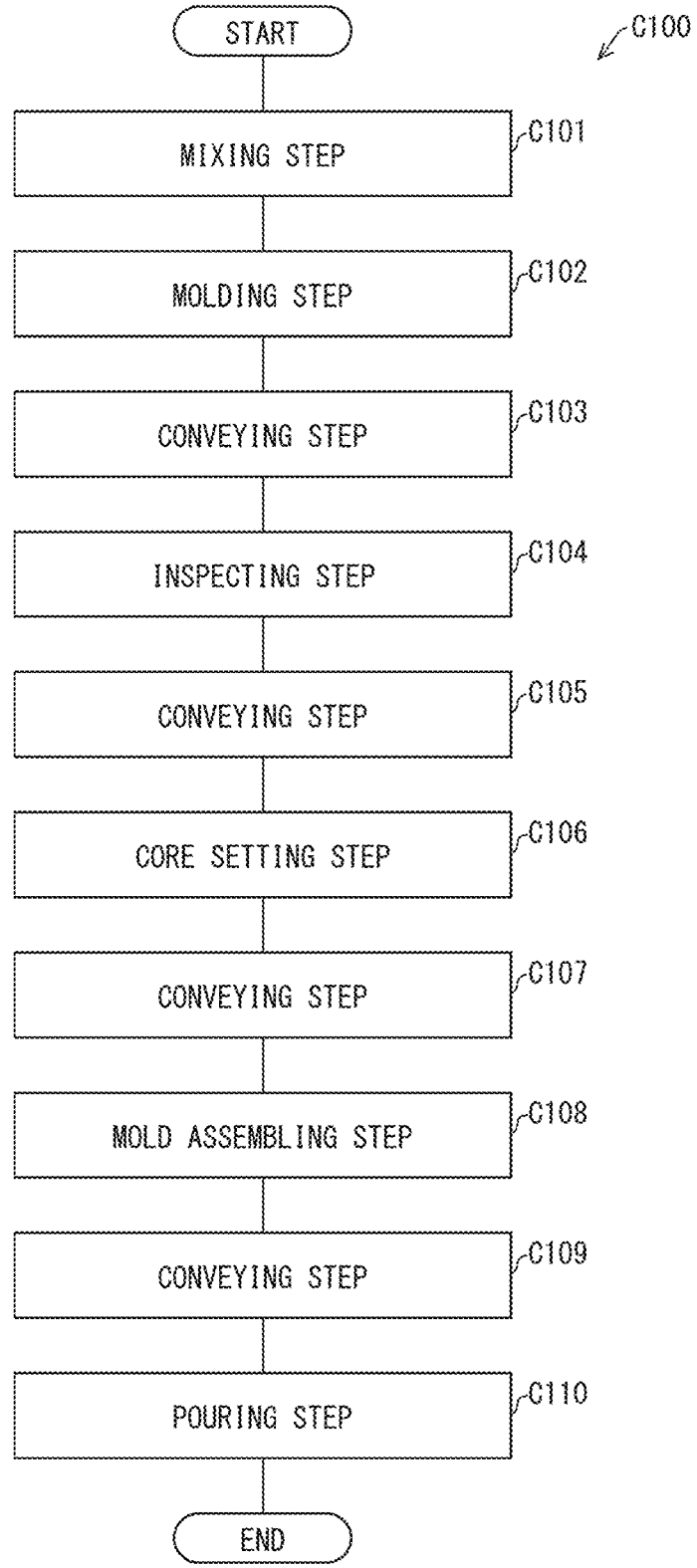
FIG. 7 is a flowchart showing a casting process performed by the casting line shown in FIG. 6.

A casting process C100 performed by the casting line C will be described below with reference to FIG. 7. FIG. 7 is a flowchart for explaining steps of a part of the casting process C100. As shown in FIG. 7, the casting process C100 includes a mixing step C101, a molding step C102, conveying steps C103, C105, C107, and C109, an inspecting step C104, a core setting step C106, a mold assembling step C108, and a pouring step C110.

In the mixing step C101, the sand muller 91 mixes foundry sand. Specifically, for example, the sand muller 91 mixes foundry sand with a binder, water, other additives (starch, sea coal, etc.), or a combination thereof. The sand property measuring device 92 measures a property of the mixed foundry sand, and transmits the measurement result as the foregoing sand information to the inspection device 1.

In the molding step C102, the molding machine 93 fills a molding flask F with the foundry sand mixed in the mixing step C101. Further, the molding machine 93 produces a cope or drag of the mold 9 by hardening the foundry sand in the molding flask F with pressure. Specifically, the molding machine 93 produces a cope when a pattern of the cope is provided in the molding flask F, and produces a drag when a pattern of the drag is provided in the molding flask F. For example, the molding machine 93 alternately produces copes and drags. Further, when this step is completed, the molding machine 93 outputs, to the conveying device 94, a signal indicating that the molding flask F can be conveyed. The molding machine 93 transmits parting agent information and setting information of the molding machine 93, which are obtained during this step, to the inspection device 1 as the foregoing molding information. In addition, sensors which are included in the sensor 98*a* and are placed around the molding machine 93 transmit a temperature, humidity, and a concentration of floating dust detected around the molding machine 93 during this step to the inspection device 1 as the foregoing environment information. In addition, sensors which are included in the sensor 98*a* and are placed around the inspection device 1 transmit a temperature, humidity, and a concentration of floating dust detected around the inspection device 1 during this step to the inspection device 1 as the foregoing environment information.

In the conveying step C103, the conveying device 94 conveys the molding flasks F from the molding machine 93 side to the downstream side. The conveying device 94 performs this step when the conveying device 94 has received, from the molding machine 93, the mold assembly device 96, and the pouring machine 97, signals indicating that the molding flasks F can be conveyed. The sensor 98*b* detects external force applied, during conveyance, to a cope or drag with the molding flask F which have been subjected to the molding step C102. The sensor 98*b* transmits the detection result to the inspection device 1 as the foregoing conveyance information. When the cope or drag with the molding flask F has been conveyed to the position P5, the inspecting step C104 is subsequently performed.

In the inspecting step C104, the camera 3 images a product surface of the cope or drag with the molding flask F at the position P5, and transmits the image thus obtained to the inspection device 1 as an inspection image. The inspection device 1 performs the foregoing inspection method M1 using the pieces of information obtained from the sand property measuring device 92, the molding machine 93, the sensors 98*a* and 98*b*, and the camera 3 in the steps C101 through C104. When the inspection device 1 has determined that there is a defect in the product surface of the cope or drag with the molding flask F in the inspection method M1, the inspection device 1 outputs warning information to the output device.

The operation of the conveying device 94 in the conveying step C105 is the same as that in the conveying step C103. When the cope or drag with the molding flask F, which had been subjected to the inspecting step C104, has been conveyed to the position P6, the core setting step C106 is subsequently performed.

In the core setting step C106, the operator sets a core in a drag when each of the molding flasks F in the core setting area 95 (positions P6 through P8) contains the drag.

Here, when the warning information has been outputted in the inspecting step C104, the operator determines, visually, whether or not the subsequent process can be performed on the cope or drag with the molding flask F for which the warning information has been outputted. If the operator has determined that the process can be performed, the operator sets a core in (if applicable) the drag with the molding flask F. If the operator has determined that the process cannot be performed, the operator registers the cope or drag with the molding flask F as a defective flask. As a result, the subsequent processes are not performed on the cope or drag with the molding flask F. The details of the defective flask will be described later.

Note that the operator can determine that the subsequent processes can be performed after applying necessary measures to the cope or drag with the molding flask F for which the warning information has been outputted. In this case, the operator applies the necessary measures to the cope or drag with the molding flask F, and then sets the core in (if applicable) the drag. Examples of necessary measures include cleaning of the product surface of the cope or drag with the molding flask F, application of a parting agent to the product surface, and the like.

The operation of the conveying device 94 in the conveying step C107 is the same as that in the conveying step C103. When the cope or drag with the molding flask F, which had been subjected to the core setting step C106, has been conveyed to the position P10, the mold assembling step C108 is subsequently performed. Note that the cope with the molding flask F is inverted by a flask inverting device (not illustrated) so that the product surface of the cope comes to the lower side before being conveyed to the position P10.

In the mold assembling step C108, the mold assembly device 96 assembles the cope with the molding flask F and the drag with the molding flask F. Thus, a mold 9 in which the cope and the drag are assembled and which is with the molding flasks F is obtained. Further, when this step is completed, the mold assembly device 96 outputs, to the conveying device 94, a signal indicating that the molding flask F can be conveyed.

The operation of the conveying device 94 in the conveying step C109 is the same as that in the conveying step C103. When the mold 9 with the molding flask F, which had been subjected to the mold assembling step C108, has been conveyed to the position P14, the pouring step C110 is subsequently performed.

In the pouring step C110, the pouring machine 97 pours molten metal into the mold 9 with the molding flask F at the position P14. Further, when this step is completed, the pouring machine 97 outputs, to the conveying device 94, a signal indicating that the molding flask F can be conveyed.

After that, the molten metal injected into the mold 9 with the molding flask F is cooled to be a casting. The casting is taken out by dismantling the mold 9 with the molding flask F.

If a defect occurs in a product surface of a mold 9, it is preferable not to perform subsequent processes using that mold 9, in order to maintain quality of castings produced in the casting line C.

In view of this, in the casting process C100, the inspecting step C104 of inspecting the product surface of the mold 9 which has been molded in the molding step C102 is performed by the inspection device 1. If warning information has been outputted to the output device in the inspecting step C104, the operator registers the cope or drag with the molding flask F, for which the warning information has been outputted, as a defective flask. As a result, the subsequent processes (the mold assembling step C108 and the pouring step C110) using that cope or drag with the molding flask F can be skipped.

Here, the details of the defective flask will be described. The defective flask is a mold 9 (or a molding flask F in which the mold 9 is placed) which has been determined to have a defect (e.g., mold drop) in a product surface thereof and thus determined not to be able to produce good quality products. In the processes prior to the mold assembling step C108, a cope or drag with a molding flask F is registered as a defective flask. The registration of the defective flask means, for example, recording information indicating the defective flask in shift data. The shift data is information stored, by a line controller (not illustrated), in a memory area corresponding to the position (P1 to P14) of the molding flask F. When the molding flask F is conveyed (shifted) by one flask, the shift data recorded in the memory area is also shifted and stored in a memory area corresponding to a position of the conveyance destination. The shift data includes, for example, data indicating a molding record (molding information), data indicating a conveyance status (conveyance information), data indicating a molten metal condition, and data indicating a record of introducing alloy materials, or identification information of a mold 9 which is associated with those data.

For example, in the core setting step C106, when the operator has determined that a cope or drag with a molding flask F for which warning information had been outputted is a defective flask, the operator performs an operation of registering the cope or drag with the molding flask F as a defective flask. For example, the registration operation can be pressing of a determination switch. The line controller records, in the shift data, information indicating that the cope or drag with the molding flask F of interest is a defective flask in accordance with the registration operation by the operator.

In the processes (the mold assembling step C108, the pouring step C110, etc.) after the core setting step C106, the devices (the mold assembly device 96, the pouring machine 97, etc.) for performing those processes refer to the shift data. The devices which have referred to the shift data skip the processes using a cope or drag with a molding flask F registered as a defective flask or using a mold 9 with a molding flask F obtained by assembling the cope and the drag.

(Case where Core Setting Step C106 is Performed by Core Setting Device)

In the above description of the casting process C100, the operator sets a core. Alternatively, a core setting device (not illustrated) for automatically setting a core can be provided in the core setting area 95. In this case, the core setting device sets a core in a drag with a molding flask F. In this case, when the inspection device 1 has determined that there is a defect in a product surface of a cope or drag with a molding flask F in the inspecting step C104, the inspection device 1 can carry out a process of registering that cope or drag with the molding flask F as a defective flask, instead of or in addition to outputting warning information to the output device. For example, the inspection device 1 transmits request information requesting the line controller to register the defective flask. Upon receipt of the request information, the line controller records, in the shift data, information indicating that the cope or drag with the molding flask F of interest is a defective flask. By referring to the shift data, the core setting device does not set a core in the drag with the molding flask F registered as a defective flask (for which the warning information has been outputted).

As described above, according to the configuration of the present embodiment, it is unnecessary to define the features of a defect and the like to be detected in the appearance of the mold, and this reduces a possibility of determining a normal mold as being not normal or determining a defective mold as being normal. As a result, the accuracy in inspection of the appearance of the mold is improved. Specifically, the accuracy in inspection of the appearance of the product surface of the mold is improved. According to the configuration of the present embodiment, the inspection accuracy is further improved by referring to one or more or all of sand information, molding information, conveyance information, and environment information in addition to an inspection image. According to the configuration of the present embodiment, the presence or absence of a defect in the appearance of the mold can be obtained. Further, according to the configuration of the present embodiment, it is possible to warn the user that there is a defect in the appearance of the mold. For example, the user can skip, by referring to warning information, subsequent processes using the mold with a defect in the appearance thereof. In addition, according to the configuration of the present embodiment, it is possible to construct a learned model for inspecting the appearance of the mold with high accuracy.

[Variation 1]

One embodiment of the present invention described above can be modified such that the input into the learned model further includes a reference image.

Figure 8:
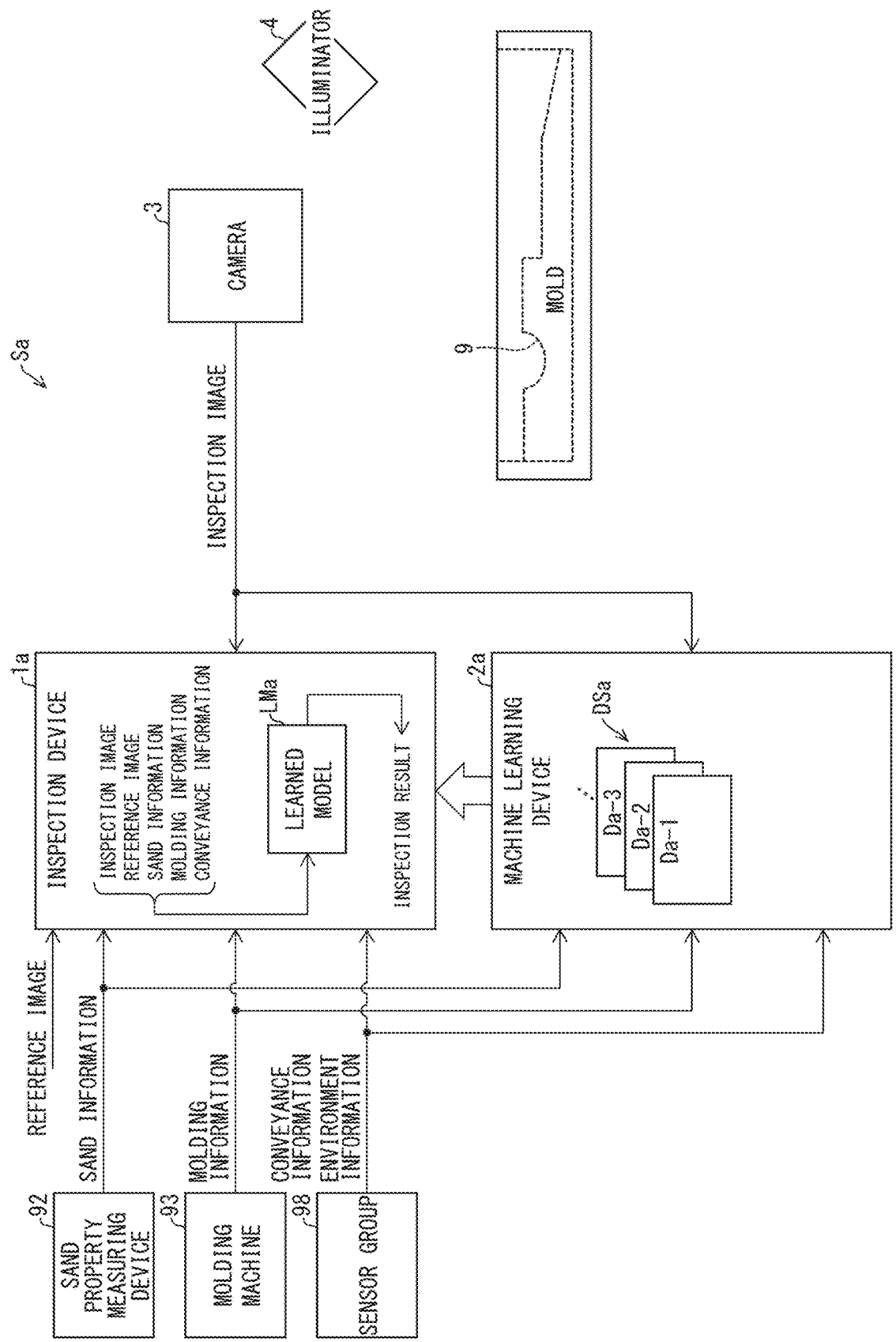
FIG. 8 is a diagram showing a configuration of an inspection system according to Variation 1 of an embodiment of the present invention.

The following description will discuss a configuration of an inspection system Sa in accordance with Variation 1, with reference to FIG. 8. FIG. 8 is a block diagram showing a configuration of the inspection system Sa. The inspection system Sa includes an inspection device 1a, a machine learning device 2a, a camera 3, and an illuminator 4.

The inspection device 1a differs from the inspection device 1 in that the inspection device 1a inspects a product surface of a mold 9 using a learned model LMa instead of the learned model LM. Other features are the same as those of the inspection device 1.

Input into the learned model LMa includes a reference image, in addition to an inspection image, sand information, molding information, conveyance information, and environment information which are similar to the input into the learned model LM. The reference image is an image of a product surface of a normal mold 9 taken by the camera 3. The normal mold 9 has no defect in the product surface. The mold 9 included as a subject in the reference image has been produced using the same type of pattern as a mold 9 included as a subject in an inspection image. Output from the learned model LMa is similar to the output from the learned model LM.

The following description will discuss an inspection method performed by the inspection device 1a, with reference to FIG. 3. The inspection method performed by the inspection device 1a is described by modifying the obtaining step M11 and the inspecting step M12 included in the inspection method M1 shown in FIG. 3 as follows. Other features are the same as those of the inspection method M1.

The obtaining step M11 is modified to obtain an inspection image, sand information, molding information, conveyance information, environment information and a reference image and to cause the primary memory 12 to store those pieces of information. The processor 11 obtains, for example, a reference image designated by a user. The reference image is designated by the user, for example, by the user inputting a storage location of the reference image in the secondary memory 13 into the inspection device 1a.

The inspecting step M12 is modified to read the inspection image, the sand information, the molding information, the conveyance information, the environment information, and the reference image from the primary memory 12 and to input those pieces of information into the learned model LMa.

The machine learning device 2a differs from the machine learning device 2 in that a dataset-for-learning DSa is used instead of the dataset-for-learning DS to construct the learned model LMa instead of the learned model LM. Other features are the same as those of the machine learning device 2.

The following description will discuss a machine learning method performed by the machine learning device 2a, with reference to FIG. 5. The machine learning method performed by the machine learning device 2a is described by modifying the steps included in the machine learning method M2 shown in FIG. 5 as follows. Other features are the same as those of the machine learning method M2.

The step M21 of constructing dataset for learning is modified to construct a dataset-for-learning DSa instead of the dataset-for-learning DS. The dataset-for-learning DSa is a set of training data Da-i (i=1, 2, ... ). The processor 21 causes the secondary memory 23 to store the training data Da-i including, as input data, (i) an inspection image taken by the camera 3, (ii) pieces of information obtained from the devices (sand information, molding information, conveyance information, environment information), and (iii) a reference image designated by the user and including, as correct data, (iv) information indicating the inspection result by the operator (information indicating presence or absence of a defect and information indicating one or more defect regions). The processor 21 repeats the above-described process to construct the dataset-for-learning DSa.

The step M22 of constructing learned model is modified to construct the learned model LMa by supervised learning using the dataset-for-learning DSa. The processor 21 then causes the secondary memory 23 to store the constructed learned model LMa.

In Variation 1, the learned model LMa, which refers to the reference image as input data in addition to the inspection image, is used, and it is therefore possible to obtain information indicating the inspection result with higher accuracy. In other words, Variation 1 further improves the inspection accuracy by referring to the reference image in addition to the inspection image.

[Variation 2]

One embodiment of the present invention described above can be modified such that a learned model used to inspect a product surface of a mold 9 is selected according to a type of pattern used to produce the mold 9.

Figure 9:
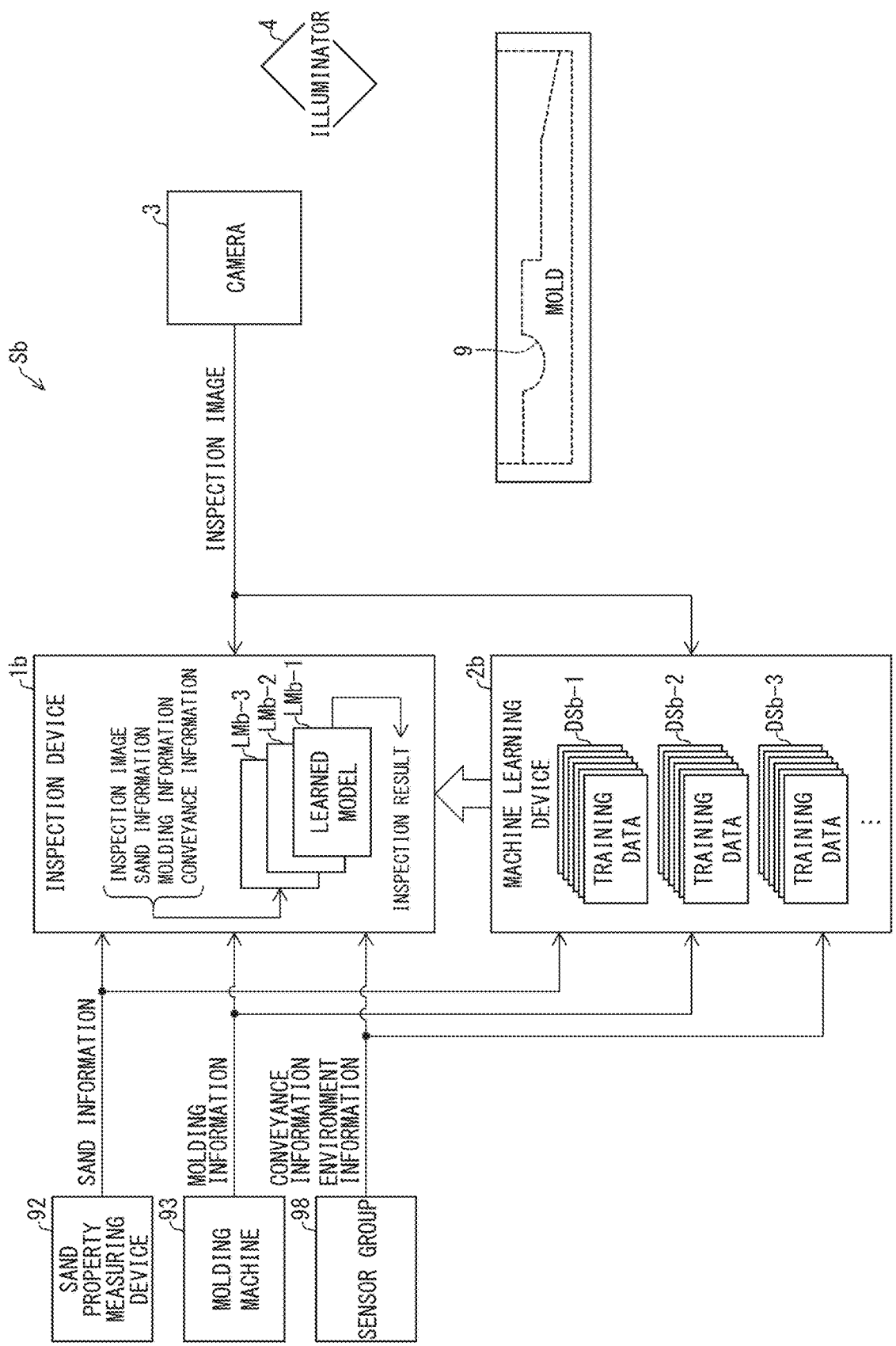
FIG. 9 is a diagram showing a configuration of an inspection system according to Variation 2 of an embodiment of the present invention.

The following description will discuss a configuration of an inspection system Sb in accordance with Variation 2, with reference to FIG. 9. FIG. 9 is a block diagram showing a configuration of the inspection system Sb. The inspection system Sb includes an inspection device 1b, a machine learning device 2b, a camera 3, and an illuminator 4.

The inspection device 1b differs from the inspection device 1 in that the inspection device 1b inspects a product surface of a mold 9 using learned models LMb-j (j=1, 2, ... ) instead of the learned model LM. j is identification information for identifying a type of pattern. A pattern of a type identified by the identification information j is also referred to as "pattern j ". In the inspection device 1b, the secondary memory 13 stores a plurality of learned models LMb-1, LMb-2, and so forth. Other features are the same as those of the inspection device.

The learned model LMb-j has been subjected to machine learning according to the pattern j. Input into and output from the learned model LMb-j are similar to the input into and output from the learned model LM.

Figure 10:
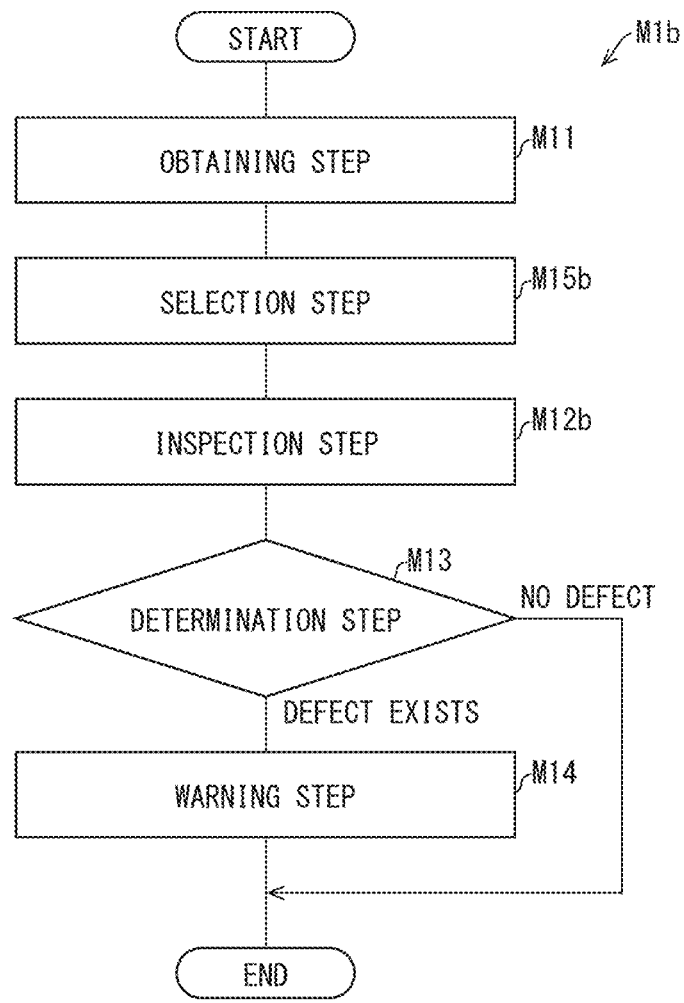
FIG. 10 is a flowchart showing a flow of an inspection method performed by an inspection device included in Variation 2 of an embodiment of the present invention.

The following description will discuss a flow of an inspection method M1b performed by the inspection device 1b, with reference to FIG. 10. FIG. 10 is a flowchart showing the inspection method M1b. The inspection method M1b differs from the inspection method M1 shown in FIG. 3 in that the inspection method M1b includes an inspecting step M12b instead of the inspecting step M12 and further includes a selection step M15b. Other steps are the same as those of the inspection method M1.

In the selection step M15b, the processor 11 obtains identification information j of a pattern inputted by a user and selects a learned model LMb-j corresponding to the obtained identification information j. The identification information j inputted by the user identifies the type of the pattern used to produce a mold 9 to be inspected.

In the inspecting step M12b, the processor 11 performs a process similar to the inspecting step M12 using the learned model LMb-j selected in the selection step M15b.

The machine learning device 2b differs from the machine learning device 2 in that the machine learning device 2b constructs a plurality of learned models LMb-1, LMb-2, and so forth. Other features are the same as those of the machine learning device 2.

Figure 11:
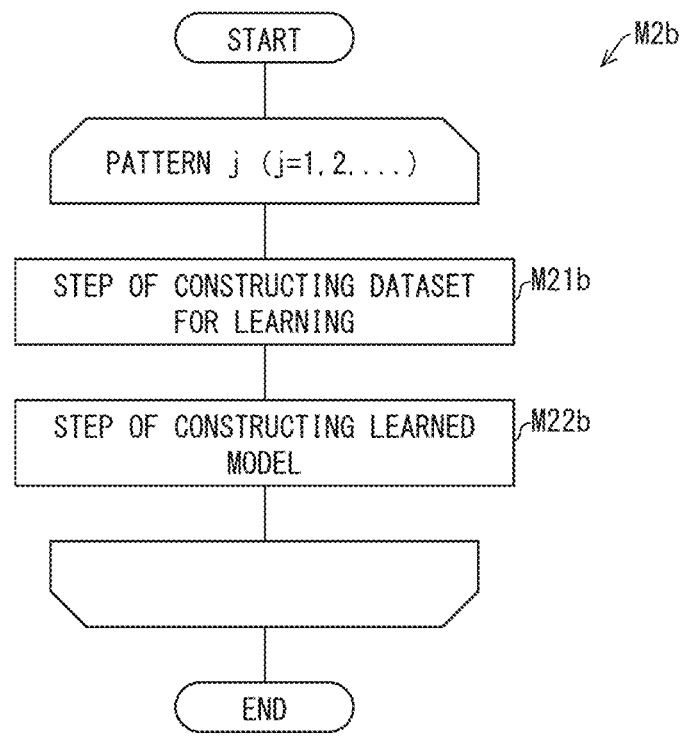
FIG. 11 is a flowchart showing a flow of a machine learning method performed by a machine learning device included in Variation 2 of an embodiment of the present invention.

The following description will discuss a flow of a machine learning method M2b performed by the machine learning device 2b, with reference to FIG. 11. FIG. 11 is a flowchart showing the machine learning method M2b. In the machine learning method M2b, a step M21b of constructing dataset for learning and a step M22b of constructing learned model are performed for each of the plurality of types of patterns 1, 2, and so forth.

In the step M21b, the processor 21 performs a process similar to the step M21 for the pattern j to construct a dataset-for-learning DSb-j.

In the step M22b, the processor 21 constructs the learned model LMb-j by supervised learning using the dataset-for-learning DSb-j. The processor 21 then causes the secondary memory 23 to store the constructed learned model LMb-j.

In Variation 2, the learned model LMb-j is constructed according to the pattern j. Thus, in Variation 2, the learned model LMb-j is selected according to the pattern j used to produce the mold 9 to be inspected, and a product surface of the mold 9 is inspected using the selected learned model LMb-j. As a result, in Variation 2, the accuracy of detecting a defect that is peculiar to the pattern j is improved. In other words, in Variation 2, it is possible to obtain an inspection result according to the type of pattern used to produce a mold, and the inspection accuracy is further improved.

[Variation 3]

One embodiment of the present invention described above can be modified by combining Variations 1 and 2.

Figure 12:
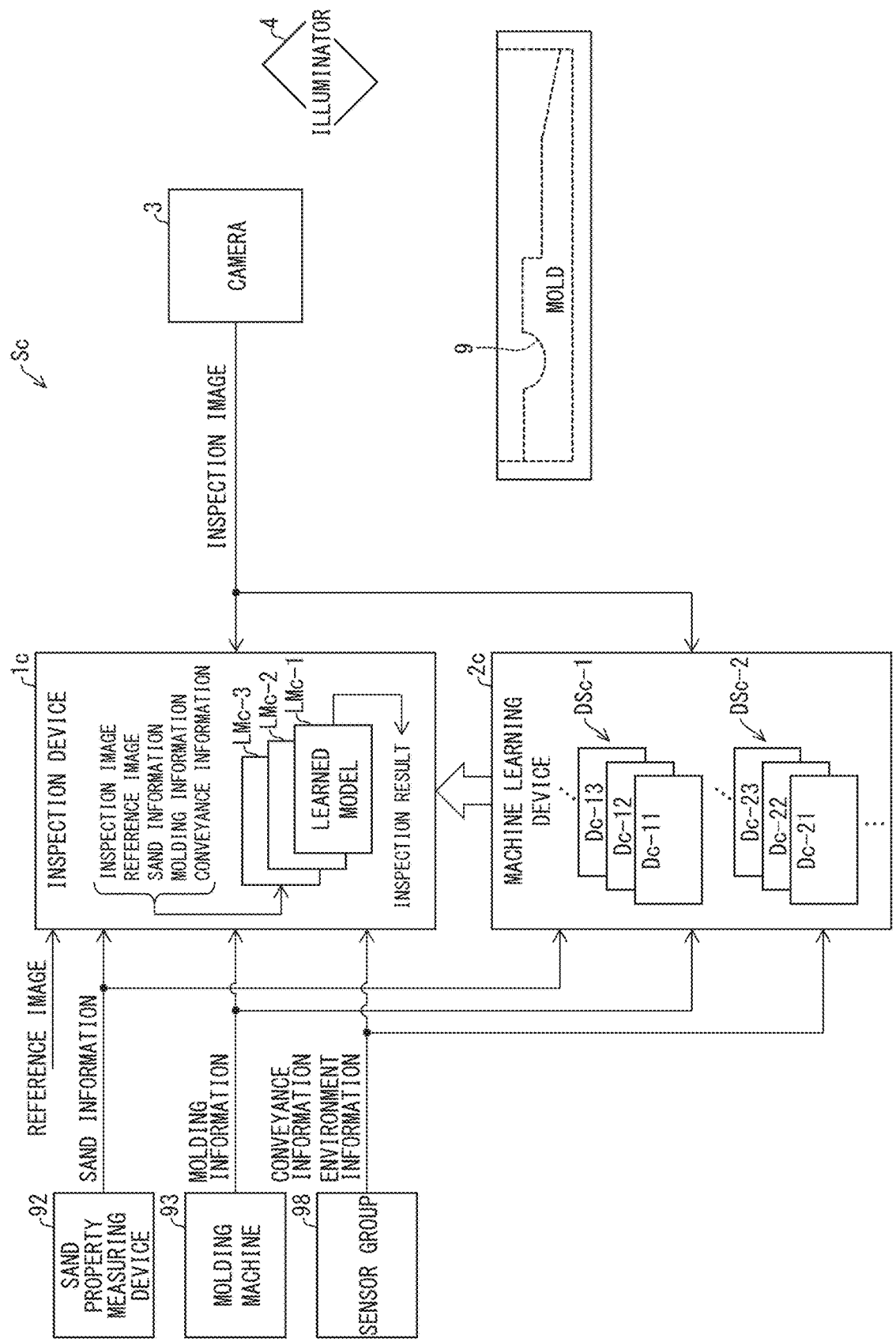
FIG. 12 is a diagram showing a configuration of an inspection system according to Variation 3 of an embodiment of the present invention.

The following description will discuss a configuration of an inspection system Sc in accordance with Variation 3, with reference to FIG. 12. FIG. 12 is a block diagram showing a configuration of the inspection system Sc. The inspection system Sc includes an inspection device 1c, a machine learning device 2c, a camera 3, and an illuminator 4.

The inspection device 1c differs from the inspection device 1b of Variation 2 in that the inspection device 1c inspects a product surface of a mold 9 using learned models LMc-j (j=1, 2, ... ) instead of the learned models LMb-j. In the inspection device 1c, the secondary memory 13 stores a plurality of learned models LMc-1, LMc-2, and so forth. Other features are the same as those of the inspection device 1b.

The learned model LMc-j has been subjected to machine learning according to the pattern j. j is identification information for identifying a type of pattern, as with Variation 2. Input into the learned model LMc-j includes a reference image, in addition to the input into the learned model LMb-j in Variation 2. That is, the input into the learned model LMc-j is similar to the input into the learned model LMa in Variation 1. Output from the learned model LMc-j is similar to the output from the learned model LMb-j in Variation 2.

The following description will discuss an inspection method performed by the inspection device 1c, with reference to FIG. 10. The inspection method performed by the inspection device 1c is described by modifying the obtaining step M11 and the inspecting step M12b included in the inspection method M1b of Variation 2 shown in FIG. 10 as follows.

The obtaining step M11 is modified to obtain an inspection image, sand information, molding information, conveyance information, environment information and a reference image and to cause the primary memory 12 to store those pieces of information. The processor 11 obtains, for example, a reference image designated by a user. The reference image is designated by the user, for example, by the user inputting a storage location of the reference image in the secondary memory 13 into the inspection device 1c.

The inspecting step M12b is modified to read the inspection image, the sand information, the molding information, the conveyance information, the environment information, and the reference image from the primary memory 12 and to input those pieces of information into the learned model LMc-j which has been selected in the selection step M15b.

The machine learning device 2c differs from the machine learning device 2b of Variation 2 in that the machine learning device 2c further uses a reference image as input data for use in constructing each of the plurality of learned models LMc-1, LMc-2, and so forth. Other features are the same as those of the machine learning device 2b.

The following description will discuss a machine learning method performed by the machine learning device 2c, with reference to FIG. 11. The machine learning method M2c is described by modifying the steps included in the machine learning method M2b of Variation 2 shown in FIG. 11 as follows.

The step M21b of constructing dataset for learning is modified to construct datasets-for-learning DSc-j (j=1, 2, ... ) instead of the datasets-for-learning DSb-j. The dataset-for-learning DSc-j is a set of training data Dc-ji (i=1, 2, ... ). The processor 21 causes the secondary memory 23 to store the training data Dc-ji including, as input data, (i) an inspection image obtained by imaging a product surface of a mold 9 by the camera 3, (ii) pieces of information obtained from the devices (sand information, molding information, conveyance information, environment information), and (iii) a reference image designated by the user and including, as correct data, (iv) information indicating the inspection result by the operator (information indicating presence or absence of a defect and information indicating one or more defect regions). The processor 21 repeats the above-described process to construct the dataset-for-learning DSc-j.

The step M22 of constructing learned model is modified to construct the learned model LMc-j by supervised learning using the dataset-for-learning DSc-j. The processor 21 then causes the secondary memory 23 to store the constructed learned model LMc-j.

In Variation 3, the learned model LMc-j is constructed according to the pattern j. The learned model LMc-j includes a reference image as input data. Thus, in Variation 3, the learned model LMc-j is selected which corresponds to the pattern j used to produce the mold 9 to be inspected, and a product surface of the mold 9 is inspected by inputting a reference image of the pattern j into the learned model LMc-j. As a result, in Variation 3, the accuracy of detecting a defect that is peculiar to the pattern j is further improved.

[Additional Remarks]

The present invention is not limited to the embodiments, but can be altered by a skilled person in the art within the scope of the claims. The present invention also encompasses, in its technical scope, any embodiment derived by combining technical means disclosed in differing embodiments.

REFERENCE SIGNS LIST 1, 1a, 1b, 1c: Inspection device
2, 2a, 2b, 2c: Machine learning device
9: Mold
11, 21: Processor
M1, M1b: Inspection method
M2, M2b: Machine learning method

The invention claimed is:

1. An inspection device, comprising:
at least one processor for performing an inspection step of inspecting a mold using a learned model constructed by machine learning,
input into the learned model being an inspection image obtained by imaging the mold and a reference image obtained by imaging a normal mold, and,
output from the learned model being information indicating at least one of a presence or an absence of a defect of the mold, a defect region of the mold, or both the presence or the absence of a defect of the mold and the defect region of the mold, wherein:
in the inspection step, the at least one processor
reads the inspection image and the reference image from a memory,
calculates the information from the inspection image and the reference image with use of the learned model, and,
writes the information in the memory.

2. The inspection device according to claim 1, wherein: the image is an image of a product surface of the mold.

3. The inspection device according to claim 1, wherein: the at least one processor further performs a selection step of selecting a learned model according to a type of a pattern used to produce the mold; and, in the inspection step, the at least one processor inspects the mold using the learned model selected in the selection step.

4. The inspection device according to claim 1, wherein: the input into the learned model further includes one or more or all of sand information indicating foundry sand constituting the mold, molding information indicating a molding status of the mold, conveyance information indicating a conveyance status of the mold, and environment information.

5. The inspection device according to claim 1, wherein: the output from the learned model indicates at least presence or absence of a defect in the mold.

6. The inspection device according to claim 5, wherein: if the output from the learned model indicates that the mold has a defect, the at least one processor further performs a warning step of outputting warning information based on information indicating the inspection result.

7. An inspection method, comprising:
an inspection step of inspecting mold using a learned model constructed by machine learning, the inspection step being performed by at least one processor,
input into the learned model being an inspection image obtained by imaging the mold and a reference image obtained by imaging a normal mold, and,
output from the learned model being information indicating at least one of a presence or an absence of a defect of the mold, a defect region of the mold, or both the presence or the absence of a defect of the mold and the defect region of the mold, wherein:
in the inspection step, the at least one processor
reads the inspection image and the reference image from a memory,
calculates the information from the inspection image and the reference image with use of the learned model, and,
writes the information in the memory.

8. A machine learning device for constructing a learned model for inspecting a mold, comprising:
at least one processor for performing a construction step of constructing, by supervised learning with a dataset-for-learning, a learned model for inspecting a mold,
input into the learned model being an inspection image obtained by imaging the mold and a reference image obtained by imaging a normal mold, the processor calculating information from the inspection image and the reference image with use of the learned model, and,
output from the constructed learned model being the information indicating at least one of a presence or an absence of a defect of the mold, a defect region of the mold, or both the presence or the absence of a defect of the mold and the defect region of the mold, wherein:
in the construction step, the at least one processor
reads the dataset-for-learning from a memory,
sets parameters defining the learned model with use of the dataset-for-learning, and
writes the learned model in the memory.

9. A machine learning method for constructing a learned model for inspecting a mold, comprising:
a construction step of constructing, by supervised learning with a dataset-for-learning, a learned model for inspecting a mold, the construction step being performed by at least one processor,
input into the learned model being an inspection image obtained by imaging the mold and a reference image obtained by imaging a normal mold the processor calculating information from the inspection image and the reference image with use of the learned model, and, output from the constructed learned model being the information indicating at least one of a presence or an absence of a defect of the mold, a defect region of the mold, or both the presence or the absence of a defect of the mold and the defect region of the mold, wherein:

in the construction step, the at least one processor
  reads the dataset-for-learning from a memory,
  sets parameters defining the learned model with use of the dataset-for-learning, and
  writes the learned model in the memory.

* * * * *